United States Patent
Zimmer et al.

(10) Patent No.: US 7,430,683 B2
(45) Date of Patent: Sep. 30, 2008

(54) METHOD AND APPARATUS FOR ENABLING RUN-TIME RECOVERY OF A FAILED PLATFORM

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/947,714

(22) Filed: Sep. 23, 2004

(65) Prior Publication Data

US 2006/0075274 A1    Apr. 6, 2006

(51) Int. Cl.
*G06F 11/00* (2006.01)
(52) U.S. Cl. ............................................. 714/2; 714/42
(58) Field of Classification Search .................... 714/2, 714/42

See application file for complete search history.

(56) References Cited

U.S. PATENT DOCUMENTS

| | | | | |
|---|---|---|---|---|
| 5,437,039 | A * | 7/1995 | Yuen | 718/108 |
| 6,453,278 | B1 * | 9/2002 | Favor et al. | 703/27 |
| 6,948,094 | B2 * | 9/2005 | Schultz et al. | 714/15 |
| 2004/0003313 | A1 * | 1/2004 | Ramirez | 714/6 |
| 2004/0162930 | A1 * | 8/2004 | Forin et al. | 711/1 |
| 2004/0225873 | A1 * | 11/2004 | Diaz | 713/1 |
| 2004/0243884 | A1 * | 12/2004 | Vu et al. | 714/42 |
| 2006/0184349 | A1 * | 8/2006 | Goud et al. | 703/24 |

* cited by examiner

*Primary Examiner*—Marc Duncan
(74) *Attorney, Agent, or Firm*—L. Cho

(57) ABSTRACT

A method for managing a run-time recovery includes loading a recovery kernel into a processor cache. The recovery kernel is executed in the processor cache. Other embodiments are described and claimed.

27 Claims, 5 Drawing Sheets

METHOD AND APPARATUS FOR ENABLING RUN-TIME RECOVERY OF A FAILED PLATFORM

TECHNICAL FIELD

Embodiments of the present invention pertain to run-time recovery of a failed platform. More specifically, embodiments of the present invention relate to a method and apparatus for utilizing a recovery kernel when the main memory of a platform has been poisoned and/or has failed.

BACKGROUND

Memory error conditions can generate disastrous results where a user is required to reset the system causing critical data from a run-time to be lost. Memory error conditions such as single and double-bit memory errors may be detected by an Error Correction Code (ECC) logic path in a memory controller.

One approach currently taken for run-time recovery is to have the memory controller seek execution of recovery code in order to recover the run-time. An operating system, for example, may be prepared to enable disaster recovery in response to memory error conditions by executing recovery code. Current operating systems, however, are constrained to having the recovery code execute within the main memory. This may be problematic if the section in main memory that is used to execute the recovery code is the same section that is experiencing memory error conditions and requires servicing itself.

Another approach that is taken for run-time recovery is to implement a service processor with a main memory independent flow for run-time recovery. Upon successful invocation of the service processor, run-time recovery may be possible. Implementing a service processor on a platform, however, requires additional space which may not always be available. Furthermore, adding a service processor would require additional costs which is not desirable.

Thus, what is needed is an effective method and apparatus for enabling run-time recovery of a failed platform.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that these specific details may not be required to practice the embodiments of the present invention. In other instances, well-known circuits, devices, and programs are shown in block diagram form to avoid obscuring embodiments of the present invention unnecessarily.

Figure 1:
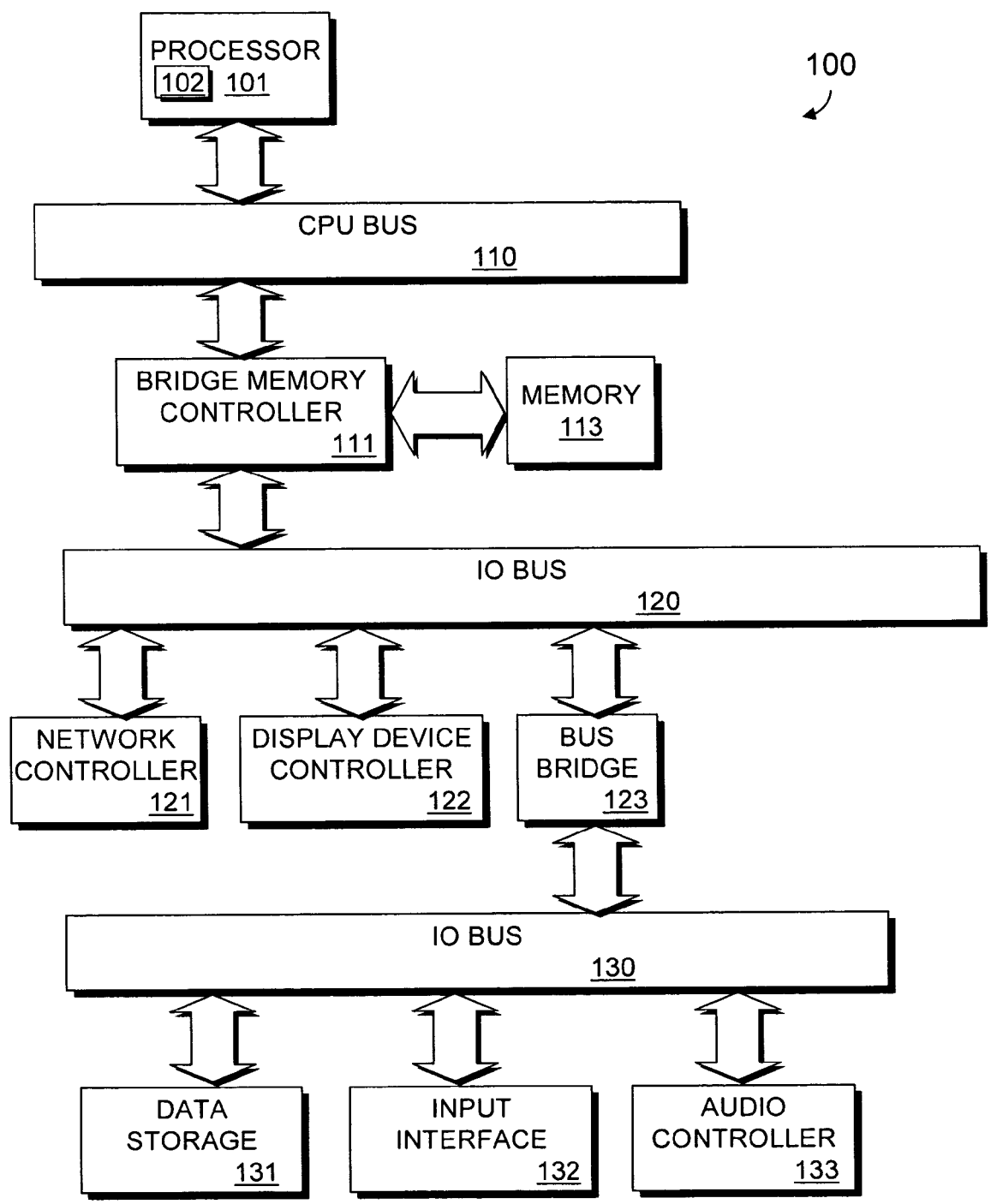
FIG. 1 illustrates a block diagram of a computer system in which an example embodiment of the present invention resides.

FIG. 1 is a block diagram of an exemplary computer system 100 in which an embodiment of the present invention resides. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. The processor 101 is coupled to a CPU bus 110 that transmits data signals between processor 101 and other components in the computer system 100.

The computer system 100 includes a memory 113. The memory 113 includes a main memory that may be a dynamic random access memory (DRAM) device. The main memory may store instructions and code represented by data signals that may be executed by the processor 101. According to one embodiment, the memory 113 includes a non-volatile memory such as read only memory. The non-volatile memory stores important instructions and code represented by data signals that may be executed by the processor 101. The computer system basic input output system (BIOS) may be stored on the non-volatile memory.

A cache memory (processor cache) 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first input output (IO) bus 120. According to an embodiment of the computer system 100, the bridge memory controller 11 detects memory error conditions such as single and double-bit memory errors in the main memory. The bridge memory controller 111 may generate a memory error signal such as a BINIT, BERR#, or other memory error signals to indicate that a memory error condition has occurred. A system management interrupt (SMI) or non-maskable interrupt (NMI) may be generated in response to the memory error signal.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage device 131 is coupled to the second IO bus 130. The data storage device 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds. A bus bridge 123 couples the first IO bus 120 to the second IO bus 130. The bus bridge 123 operates to buffer and bridge data signals between the first IO bus 120 and the second IO bus 130.

Figure 2:
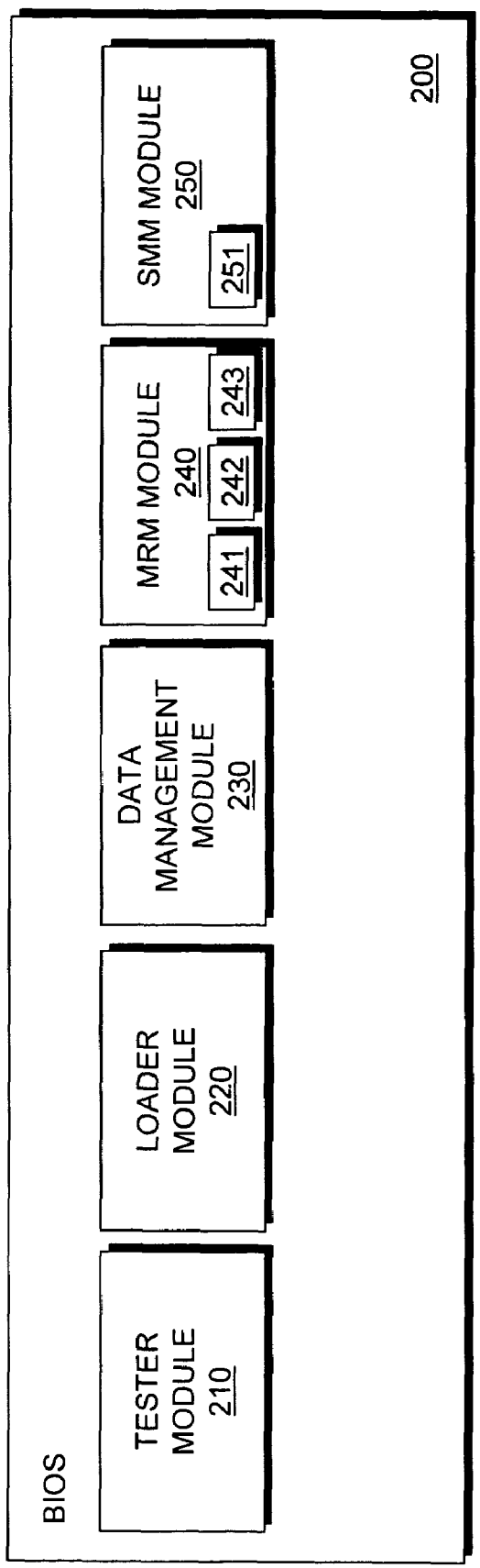
FIG. 2 is a block diagram of a basic input output system used by a computer system according to an example embodiment of the present invention.

FIG. 2 is a block diagram of a BIOS 200 used by a computer system according to an embodiment of the present invention. The BIOS 200 shown in FIG. 2 may be used to implement the BIOS stored in the memory 113 (shown in FIG. 1). The BIOS 200 includes programs that may be run when a computer system is booted up and programs that may be run in response to triggering events. The BIOS 200 may include a tester module 210. The tester module 210 performs a power-on self test (POST) to determine whether the components on the computer system are operational.

The BIOS 200 may include a loader module 220. The loader module 220 locates and loads programs and files to be executed by a processor on the computer system. The programs and files may include, for example, boot programs, system files (e.g. initial system file, system configuration file, etc.), and the operating system.

The BIOS 200 may include a data management module 230. The data management module 230 manages data flow between the operating system and components on the computer system 100. The data management module 230 may operate as an intermediary between the operating system and components on the computer system and operate to direct data to be transmitted directly between components on the computer system.

The BIOS 200 may include a memory recovery module (MRM) 240. The memory recovery module 240 includes a recovery kernel locator unit 241. The recovery kernel locator unit 241 may search a computer system, such as the computer system 100 shown in FIG. 1, or a system over a network connected to the computer system for a location of a recovery kernel. A general location may be specified for the recovery kernel locator 241 to search. According to an embodiment of the memory recovery module 240, the recovery kernel locator unit 241 writes the recovery kernel into a reserved location in main memory. In an alternate embodiment of the memory recovery module 240, the recovery kernel locator unit 241 does not write the recovery kernel into a reserved location in memory and future references to the recovery kernel are made at its original location. The memory recovery module 240 may include a recovery kernel verification unit 242. The recovery kernel verification unit 242 may check a digital signature on the recovery kernel to confirm its source and authenticity. The memory recovery module 240 includes a handler interface 243. The handler interface 243 informs an interrupt handler whether a recovery kernel has been located and a location of the recovery kernel. According to an embodiment of the memory recovery module 240, the handler interface 243 informs an SMI handler. According to an alternate embodiment of the memory recovery module 240, the handler interface 243 informs a NMI handler supported by an operating system on the computer system.

The BIOS 200 may include a system management mode (SMM) module 250. According to an embodiment of the present invention, a memory controller, such as the bridge memory controller 111 (shown in FIG. 1), identifies various events and timeouts. When such an event or timeout occurs, a system management interrupt (SMI) is asserted which puts a processor into SMM. In SMM, the SMM module 250 saves the state of the processor and redirects all memory cycles to a protected area of main memory reserved for SMM. The system management mode module 250 includes an SMI handler 251. The SMI handler 251 determines the cause of the SMI and operates to resolve the problem. According to an embodiment of the SMM module 250, upon determining that a memory error condition exists, the SMI handler 251 determines whether a recovery kernel is available. If a recovery kernel is available, a retriever unit in the SMI handler 251 loads the recovery kernel into a processor cache, such as cache 102 (shown in FIG. 1). An execution unit in the SMI handler 251 executes the recovery kernel in the cache. In one embodiment, the SMI handler 251 loads and executes the recovery kernel into a cache using the SENTER/ENTERAC instructions available on computer systems that are supported by LaGrande Technology.

According to an embodiment of the present invention, an NMI handler may perform some of the functionalities described with reference to the SMI handler 251. For example, upon determining that a memory error condition exists, the NMI handler may determine whether a recovery kernel is available. If a recovery kernel is available, the NMI handler may load the recovery kernel into a processor cache, such as cache 102, and executes the recovery kernel in the cache. The NMI handler may load and execute the recovery kernel into a cache using the SENTER/ENTERAC instructions available on computer systems that are supported by LaGrande Technology. Thus, it should be appreciated that the functionalities described with reference to the SMI handler 251 may also be performed by an NMI handler supported by an operating system on the computer system.

It should be appreciated that the tester module 210, loader module 220, data management module 230, memory recovery module 240, and system management mode module 250 may be implemented using any appropriate procedures or techniques.

Figure 3:
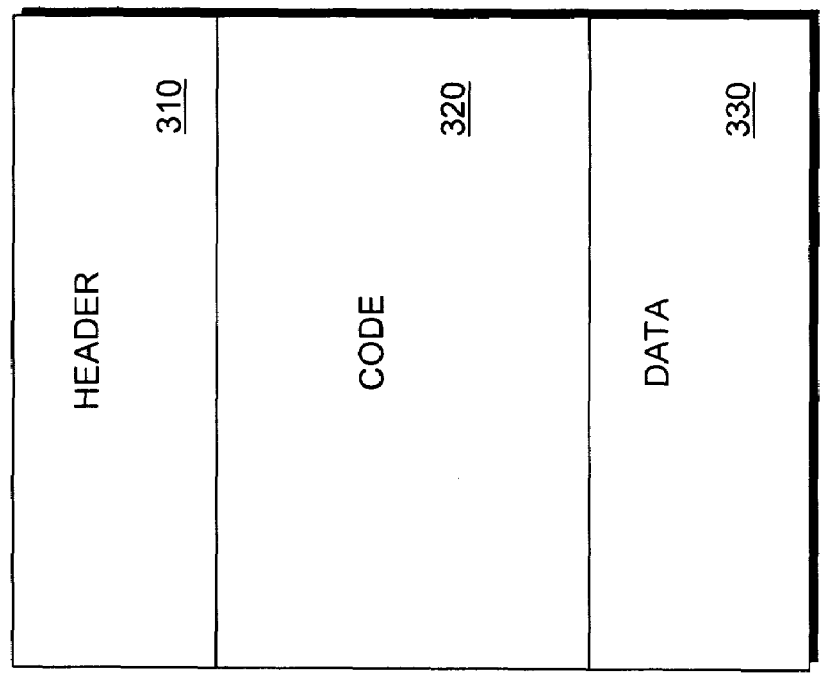
FIGS. 3 is a block diagram of a recovery kernel according to an example embodiment of the present invention.

FIGS. 3 is a block diagram of a recovery kernel 300 according to an embodiment of the present invention. The recovery kernel 300 may be a short program that may be executed to help a computer system experiencing memory errors to recover. According to an embodiment of the present invention, the recovery kernel 300 is a 32 k module. The recovery kernel 300 includes a header section 310. The header section 310 may include integrity information that allows the recovery kernel 300 to be verified. The header section 310 may also include an offset that may be used to determine a code entry point. The header section 310 may have a fixed size.

The recovery kernel 300 includes a code section 320. The code section 320 may include instructions that implement a recovery module. The recovery module may save information about states of components in a computer system and/or data being processed. The recovery module may generate an error log that describes an origin of the memory error condition. The recovery module may also generate and transmit a notification that describes the memory error condition.

The recovery kernel 300 includes data section 330. The data section 330 may include domain or platform specific data that is used to maintain data structures.

It should be appreciated that the recovery kernel 300 may include other components to perform other functionalities.

For example, the recovery kernel 300 may have a miniature version of a device driver for a network and/or disk access to affect logging and/or repurposing of a platform.

Figure 4:
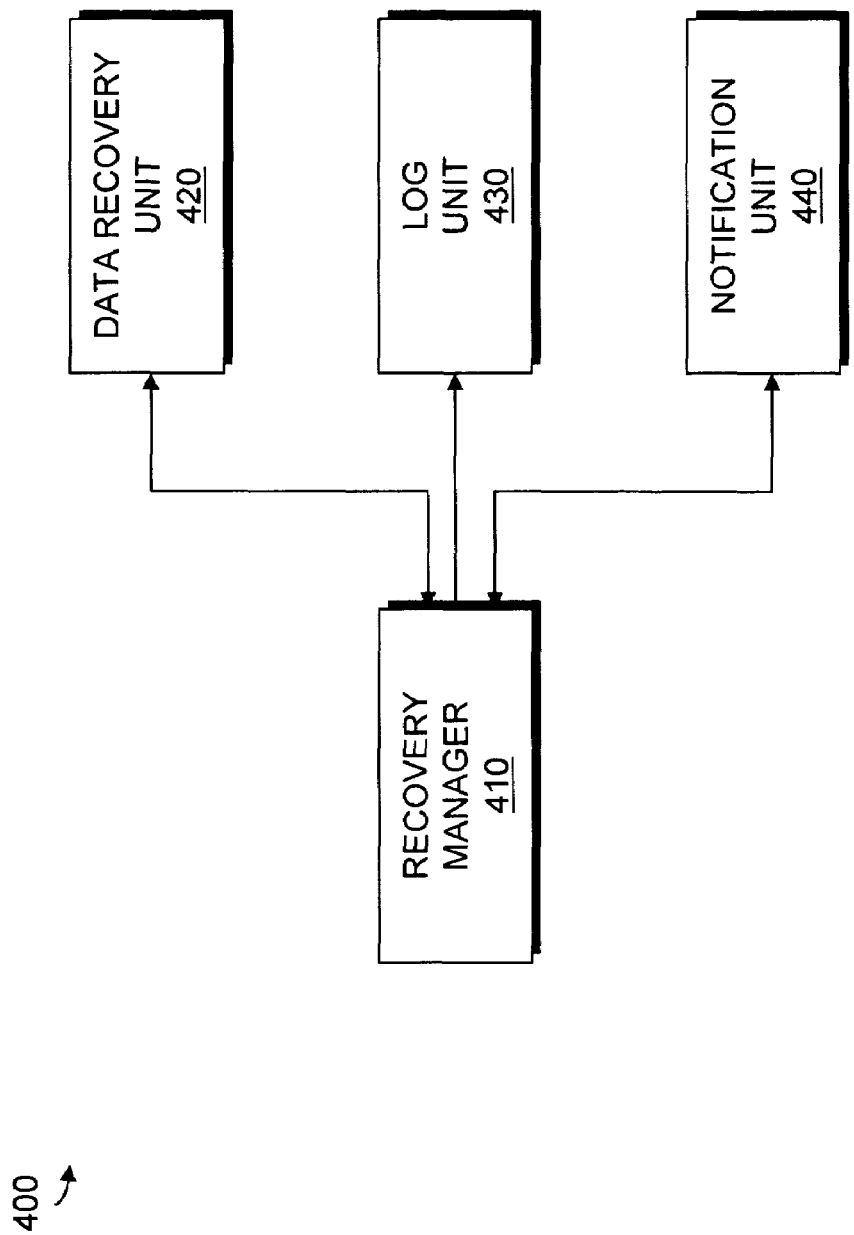
FIG. 4 is a block diagram of a recovery module according to an example embodiment of the present invention.

FIG. 4 is a block diagram of a recovery module 400 according to an embodiment of the present invention. The recovery module 400 may be implemented in the code section 320 shown in FIG. 3. The recovery module 400 includes a recovery manager 410. The recovery manager 410 interfaces with the components in the recovery module 400 and manages the operation of the components in the recovery module 400. According to an embodiment of the present invention, the recovery manager 410 communicates with a processor and a bridge memory controller to access error source registers, latches that store addresses of offending errors, model specific registers in the processor that capture location of poisoned cycles, and/or other components. The recovery manager 410 may, for example, communicate with a system node controller on the bridge memory controller to determine a line in main memory with a single bit error or multi-bit error. In one embodiment, the recovery manager provides remediation to repair errors discovered.

The recovery module 400 includes a data recovery unit 420. The data recovery unit 420 collects data from a computer system and saves it in non-volatile memory. The data recovery unit 420 may collect data, for example, from processor registers, main memory, and other components in the computer system.

The recovery module 400 includes a log unit 430. The log unit 430 generates an error log that describes the memory error condition. According to an embodiment of the recovery module 400, the log unit 430 generates a binary record of location, time, and/or other information that may be used to assist in subsequent diagnosis and repair. The error log may be formatted into a proprietary error log record that is written to a local non-volatile store, volatile store, service processor, and/or network message.

The recovery module 400 includes a notification unit 440. The notification unit 440 generates a notification that describes the memory error condition. The notification may include, for example, the error log generated by the log unit 430. The notification unit 440 may transmit the notification to a user of the computer system, a manufacturer of a component that is causing the memory error condition, or other destination.

It should be appreciated that the recovery manager 410, data recovery unit 420, log unit 430, and notification unit 440 may be implemented using any appropriate procedures or techniques.

Figure 5:
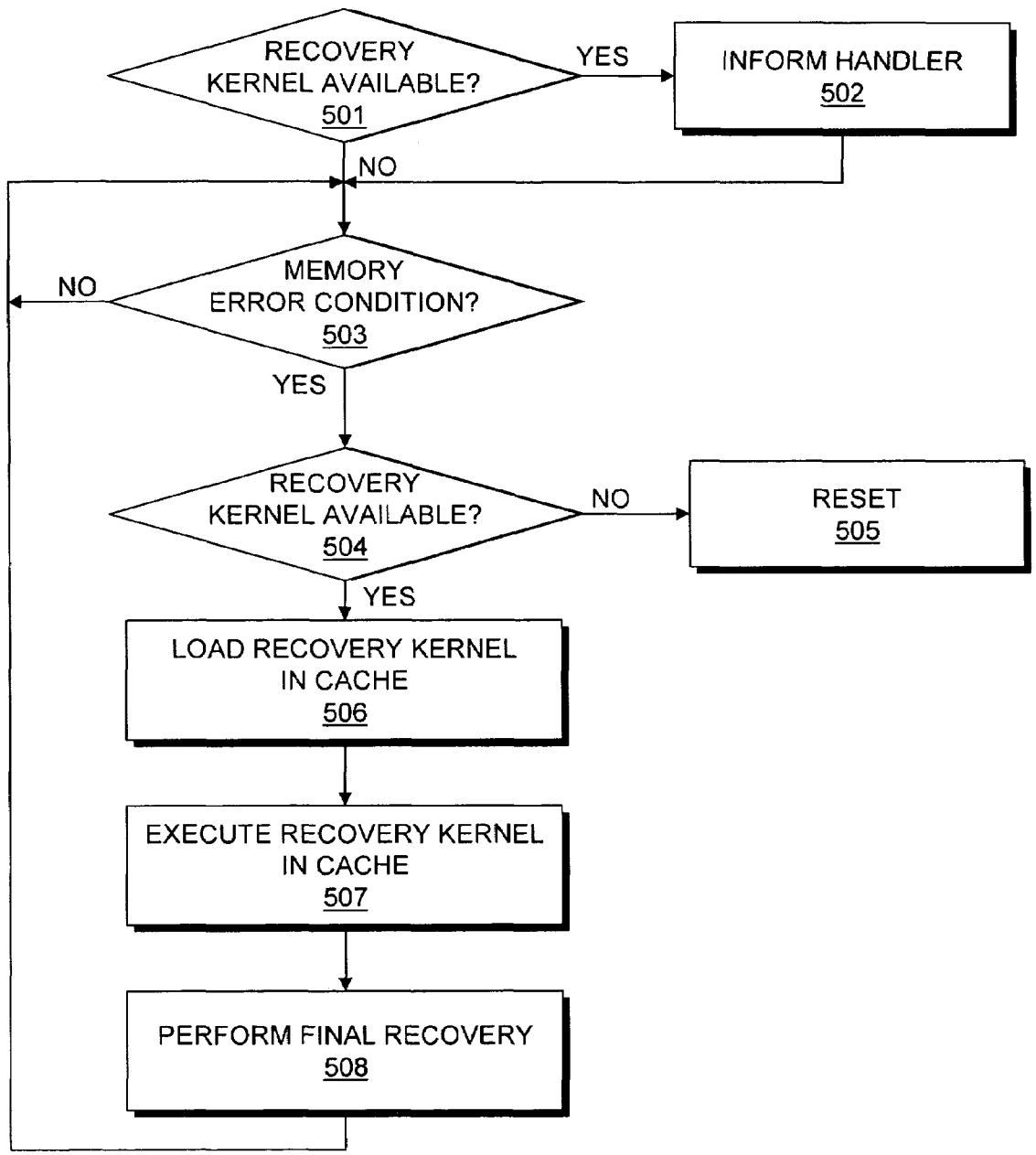
FIG. 5 is a flow chart illustrating a method for performing recovery of a run-time according to an example embodiment of the present invention.

FIG. 5 is a flow chart illustrating a method for performing recovery of a run-time according to an embodiment of the present invention. At 501, it is determined whether a recovery kernel is available. According to an embodiment of the present invention, a search is performed to determine a location of the recovery kernel. A general location of the recovery kernel, such as the ROM, data storage components in a computer system, or another system over a network, may be specified as a search parameter. If a recovery kernel is available, control proceeds to 502. If a recovery kernel is not available, control proceeds to 503. It should be appreciated that 501 may be performed during or after the initialization of memory, memory controller, and/or other components during the start of a computer system.

At 502, an interrupt handler is informed about the availability of the recovery kernel and is given the location of the recovery kernel. The interrupt handler may be, for example, an SMI handler or an NMI handler. According to an embodiment of the present invention, the recovery kernel may be written into a designated location, such as a reserved area in main memory. This new location may be given to the interrupt handler.

At 503, it is determined whether a memory error condition has occurred. This determination may be made, for example, by detecting BINIT, BERR#, or other signal. If a memory error condition has occurred, control proceeds to 504. If a memory error condition has not occurred, control returns to 503.

At 504, it is determined whether a recovery kernel is available. If a recovery kernel is not available, control proceeds to 505. If a recovery kernel is available, control proceeds to 506.

At 505, the computer system is reset without recovering the run-time.

At 506, the recovery kernel is loaded into a processor cache. According to an embodiment of the present invention, the recovery kernel is loaded directly into the processor cache from a non-main memory location. The location of the recovery kernel is determined from 501.

At 507, the recovery kernel is executed in the processor cache. According to an embodiment of the present invention where the computer system supports LaGrande Technology, 506 and 507 may be performed using the SENTER/ENTERAC. It should be appreciated that 504, 506, and 507 may be performed with the assistance of an SMI or NMI handler.

At 508, final recovery is performed on the computer system. Final recovery may include executing additional recovery program(s) out of main memory. Control returns to 503.

FIGS. 5 is a flow chart illustrating an embodiment of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

Embodiments of the present invention allow a computer system experiencing memory error conditions to recover during run-time. By having a run-time component execute recovery code, such as the recovery kernel shown in FIG. 3, in a cache of a processor, recovery may be initiated despite a poisoned and/or failed main memory. According to one embodiment of the present invention, Cache-as-RAM (CRAM) mode available on computer systems that support LaGrande Technology may be invoked to support recovery of the computer system.

In the foregoing specification, the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A method for managing a run-time recovery, comprising:

informing an operating system of a location of a recovery kernel;

loading the recovery kernel into a processor cache directly from a non-main memory location; and executing the recovery kernel in the processor cache.

2. The method of claim 1, further comprising determining a location of the recovery kernel.

3. The method of claim 2, wherein determining the location of the recovery kernel comprises searching a hard disk.

4. The method of claim 2, wherein determining the location of the recovery kernel comprises searching dynamic random access memory (DRAM).

5. The method of claim 2, wherein determining the location of the recovery kernel comprises searching read only memory (ROM).

6. The method of claim 2, wherein determining the location of the recovery kernel comprises searching over a network.

7. The method of claim 1, further comprising informing a system management interrupt (SMI) handler of a location of the recovery kernel.

8. The method of claim 1, further comprising invoking an interrupt handler in response to detecting a memory error condition.

9. The method of claim 8, wherein the interrupt handler is a system management interrupt (SMI) handler.

10. The method of claim 8, wherein the interrupt handler is a non-maskable interrupt (NMI) handler.

11. The method of claim 8, wherein the memory error condition is determined from a BINIT signal.

12. The method of claim 8, wherein the memory error condition is determined from a BERR# signal.

13. The method of claim 1, further comprising determining an authenticity of the recovery kernel.

14. An article of manufacture comprising a machine accessible medium including sequences of instructions, the sequences of instructions including instructions which when executed cause the machine to perform:
   informing an operating system of a location of a recovery kernel;
   loading the recovery kernel into a processor cache; and
   executing the recovery kernel in the processor cache.

15. The article of manufacture of claim 14, further comprising instructions which when executed cause the machine to perform determining a location of the recovery kernel.

16. The article of manufacture of claim 14, further comprising instructions which when executed cause the machine to perform informing a system management interrupt (SMI) handler of a location of the recovery kernel.

17. The article of manufacture of claim 14 further comprising instructions which when executed cause the machine to perform invoking an interrupt handler in response to detecting a memory error condition.

18. The article of manufacture of claim 17, wherein the interrupt handler is a system management interrupt (SMI) handler.

19. The article of manufacture of claim 17, wherein the interrupt handler is a non-maskable interrupt (NMI) handler.

20. An interrupt handler, comprising:
   a retriever unit to load a recover kernel into a processor cache in response to a memory error conduction determined from one of a BINIT signal and a BERR# signal; and
   an execution unit to execute the recovery kernel in the processor cache.

21. A memory recovery module, comprising:
   a recovery kernel locator unit to determine a location of a recovery kernel;
   a recovery kernel verification unit to check a digital signature of the recovery kernel; and
   a handler interface to inform an interrupt handler of the location of the recovery kernel.

22. The memory recovery module of claim 21, wherein the interrupt handler is a system management interrupt (SMI) handler.

23. The memory recovery module of claim 21, wherein the interrupt handler is non-maskable interrupt (NMI) handler.

24. A computer system, comprising:
   a processor having a processor cache;
   main memory; and
   an interrupt handler having a retriever unit to load a recovery kernel into the processor cache, and an execution unit to execute the recovery kernel in the processor cache in response to a memory error condition determined from one of a BINIT signal and a BERR# signal.

25. A method for managing a run-time recovery, comprising:
   invoking an interrupt handler in response to detecting a memory error condition determined from one of a BINIT and a BERR# signal;
   loading a recovery kernel into a processor cache directly from a non-main memory location; and
   executing the recovery kernel in the processor cache.

26. A method for managing a run-time recovery, comprising:
   determining a location of a recovery kernel by searching one of a hard disk, a dynamic random access memory, read only memory, and a network;
   loading the recovery kernel into a processor cache directly from a non-main memory location; and
   executing the recovery kernel in the processor cache.

27. A method for managing a run-time recovery, comprising:
   determining an authenticity of a recovery kernel a recovery kernel;
   loading the recovery kernel into a processor cache directly from a non-main memory location; and
   executing the recovery kernel in the processor cache.

* * * * *